(12) United States Patent
San Roman Alerigi et al.

(10) Patent No.: US 12,487,075 B2
(45) Date of Patent: Dec. 2, 2025

(54) CHARACTERIZING ROCK PROPERTIES WITH OPTICAL ENERGY SOURCES IN A WELLBORE

(71) Applicant: Saudi Arabian Oil Company, Dhahran (SA)

(72) Inventors: Damian Pablo San Roman Alerigi, Al Khobar (SA); Safiyah Alghamdi, Dhahran (SA); Sameeh Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 47 days.

(21) Appl. No.: 18/639,393

(22) Filed: Apr. 18, 2024

(65) Prior Publication Data

US 2025/0327656 A1     Oct. 23, 2025

(51) Int. Cl.
*G01B 11/02*     (2006.01)
*E21B 49/00*     (2006.01)
(Continued)

(52) U.S. Cl.
CPC .......... *G01B 11/026* (2013.01); *E21B 49/006* (2013.01); *G01B 9/02094* (2013.01); *G01B 11/303* (2013.01); *G01V 8/02* (2013.01)

(58) Field of Classification Search
CPC .............. G01B 11/026; G01B 9/02094; G01B 11/303; E21B 49/006; G01V 8/02
See application file for complete search history.

(56) References Cited

U.S. PATENT DOCUMENTS

| 4,331,975 A | 5/1982 | Krawza et al. |
| 5,663,559 A * | 9/1997 | Auzerais ............... E21B 47/113 250/269.1 |

(Continued)

FOREIGN PATENT DOCUMENTS

| CN | 111456716 | 7/2020 |
| WO | WO 2013050791 | 4/2013 |
| WO | WO 2016044144 A1 | 3/2016 |

OTHER PUBLICATIONS

San-Roman-Alerigi et al., "Machine Learning and the Analysis of High-Power Electromagnetic Interaction with Subsurface Matter," presented at the SPE Middle East Oil and Gas Show and Conference, Manama, Bahrain, Mar. 18-21, 2019, 11 pages.

(Continued)

*Primary Examiner* — Jonathan M Hansen
(74) *Attorney, Agent, or Firm* — Fish & Richardson P.C.

(57) ABSTRACT

A downhole tool system includes a bottom hole assembly that includes a connector; a laser head; a light source; a sensing assembly; and a controller. The connector is configured to couple to a downhole conveyance run into a wellbore to a reservoir rock formation. The laser head is configured to emit a laser beam toward the reservoir rock formation at a fixed frequency. The light source emitter is configured to emit a light beam toward the reservoir rock formation. The sensing assembly includes at least one optical receiver configured to (1) receive a reflected laser beam and a reflected light beam, and (2) interfere the reflected laser beam with the reflected light beam. The controller is configured to perform operations including generating a speckle interferogram based on the interference; and determining an angular displacement and an axial displacement of the wellbore based on the speckle interferogram.

24 Claims, 9 Drawing Sheets

(51) Int. Cl.
*G01B 9/02* (2022.01)
*G01B 11/30* (2006.01)
*G01V 8/02* (2006.01)

(56) References Cited

U.S. PATENT DOCUMENTS

| | | |
|---|---|---|
| 7,841,982 B2 | 11/2010 | Johnson et al. |
| 9,297,647 B2 | 3/2016 | Knuttel |
| 9,765,609 B2 | 9/2017 | Chemali et al. |
| 10,254,404 B2 | 4/2019 | Demirel et al. |
| 2008/0204759 A1 | 8/2008 | Choi |
| 2012/0250017 A1 | 10/2012 | Morys et al. |
| 2014/0278111 A1* | 9/2014 | Gerrie .................. E21B 47/002 702/8 |
| 2016/0245718 A1* | 8/2016 | Chan ....................... G01M 3/04 |
| 2021/0063601 A1* | 3/2021 | DiFoggio ............... G06V 20/52 |
| 2022/0290553 A1 | 9/2022 | San Roman Alerigi |
| 2022/0351037 A1 | 11/2022 | Li et al. |
| 2023/0036713 A1 | 2/2023 | Pattnaik |
| 2023/0135275 A1 | 5/2023 | AlQatari et al. |

OTHER PUBLICATIONS

International Search Report and Written Opinion in International Appln. No. PCT/US2025/024997, mailed on Jun. 18, 2025, 13 pages.

International Search Report and Written Opinion in International Appln. No. PCT/US2025/024999, mailed on Jun. 17, 2025, 13 pages.

Nelson et al., "Residual Stress Determination by Hole Drilling Combined with Optical Methods," Experimental Mechanics, Jan. 28, 2010, 50(2):145-158.

* cited by examiner

CHARACTERIZING ROCK PROPERTIES WITH OPTICAL ENERGY SOURCES IN A WELLBORE

TECHNICAL FIELD

This disclosure relates to systems and methods of characterizing rock properties using optical energy sources in a wellbore.

BACKGROUND

The interaction of high power lasers with subsurface matter, such as rock formations, can be complex, intense, and fast-paced. There are different parameters that affect the laser operations, including electromagnetic, structural, and chemical. To improve geo-steering and sweet spot classification, real-time identification of rocks along with their petrophysical properties during high-power laser operations are desirable. Conventional techniques for detecting wellbore displacement relied on LiDAR or calipers to measure the displacement of the wellbore. Conventional LiDARs operational ranges are above ten centimeters from the source and require high reflectance to keep accuracy. These conditions limit their applicability in wellbore characterization.

SUMMARY

In an example implementation, a downhole tool system includes a bottom hole assembly that includes a connector; a laser head; at least one light source emitter; and a sensing assembly. The connector is configured to couple to a downhole conveyance run into a wellbore from a terranean surface to a reservoir rock formation. The laser head is configured to emit a laser beam toward the reservoir rock formation at a fixed frequency. The at least one light source emitter is configured to emit a light beam toward the reservoir rock formation. The sensing assembly includes at least one optical receiver configured to (1) receive a reflected laser beam from the reservoir rock formation and a reflected light beam from the reservoir rock formation, and (2) interfere the reflected laser beam with the reflected light beam. The downhole tool system includes a controller communicably coupled to the sensing assembly and configured to perform operations including generating at least one speckle interferogram based on the interference between the reflected laser beam and the reflected light beam; and determining an angular displacement and an axial displacement of the wellbore based on the at least one speckle interferogram.

In an aspect combinable with the example implementation, the emitted light beam has a wavelength at a long IR spectrum.

In another aspect combinable with one, some, or all of the previous aspects, the wavelength is at 1500-1600 nanometers.

In another aspect combinable with one, some, or all of the previous aspects, the laser head is configured to emit the laser beam toward the reservoir rock formation to induce a thermal change on the reservoir rock formation and change a stress state of the reservoir rock formation.

In another aspect combinable with one, some, or all of the previous aspects, the emitted light beam is tuned to transmit through a wellbore fluid in the wellbore.

In another aspect combinable with one, some, or all of the previous aspects, the at least one light source emitter includes a single light source; a plurality of optical fibers configured to emit a plurality of light beams from the single light source; and an optical array configured to radially illuminate the reservoir rock formation with the plurality of light beams.

In another aspect combinable with one, some, or all of the previous aspects, the sensing assembly is configured to interfere the reflected laser beam with the plurality of reflected light beams with an optical-fiber-based beam splitter.

In another aspect combinable with one, some, or all of the previous aspects, the at least one light source emitter includes an array of light source emitters radially arranged around the BHA and configured to radially illuminate the reservoir rock formation with a plurality of light beams.

In another aspect combinable with one, some, or all of the previous aspects, the at least one optical receiver includes two optical receivers, and each receiver includes a photodetector array.

In another aspect combinable with one, some, or all of the previous aspects, the sensing assembly is configured to direct a first portion of the reflected light beams on the photodetector array and a second portion of the reflected light beams on a spectrometer.

In another aspect combinable with one, some, or all of the previous aspects, the reflected light beam includes spectral reflectance information.

In another aspect combinable with one, some, or all of the previous aspects, the operations include determining a rock type of the reservoir rock formation based on the spectral reflectance information.

In another aspect combinable with one, some, or all of the previous aspects, the operations include generating a plurality of speckle interferograms based on the interference between the reflected laser beam and the reflected light beam, where each of the speckle interferograms is generated at a particular time instant; and recording the plurality of speckle interferogram into a time-lapse interferogram.

In another aspect combinable with one, some, or all of the previous aspects, the operations include determining a wellbore roughness for each of the plurality of speckle interferogram in the time-lapse interferogram; determining a change of wellbore roughness over the time-lapse interferogram; and determining the angular displacement and the axial displacement of the wellbore based on the change of wellbore roughness.

In another example implementation, a method of determining one or more wellbore characteristics includes positioning a bottom hole assembly (BHA) on a downhole conveyance at a reservoir rock formation in a wellbore. The BHA includes a laser head; at least one light source emitter; and a sensing assembly including at least one optical receiver. The method includes operating the laser head to emit a laser beam toward the reservoir rock formation at a fixed frequency; operating the at least one light source emitter to emit a light beam toward the reservoir rock formation; sensing, with the at least one optical receiver, a reflected laser beam from the reservoir rock formation and a reflected light beam from the reservoir rock formation; interfering, with the sensing assembly, the reflected laser beam with the reflected light beam to generate an interferogram; generating, with a controller communicably coupled to the sensing assembly, generating at least one speckle interferogram based on the interference between the reflected laser beam and the reflected light beam; and determining, with the controller, an angular displacement and an axial displacement of the wellbore based on the at least one speckle interferogram.

An aspect combinable with the example implementation includes operating the at least one light source emitter to emit the light beam toward the reservoir rock formation with a wavelength at a long IR spectrum.

In another aspect combinable with one, some, or all of the previous aspects, the wavelength is at 1500-1600 nanometers.

Another aspect combinable with one, some, or all of the previous aspects includes operating the laser head to emit the laser beam toward the reservoir rock formation to induce a thermal change on the reservoir rock formation and change a stress state of the reservoir rock formation.

Another aspect combinable with one, some, or all of the previous aspects includes operating the at least one light source emitter to emit the light beam toward the reservoir rock formation at a frequency or wavelength that is tuned to transmit through a wellbore fluid in the wellbore.

In another aspect combinable with one, some, or all of the previous aspects, the at least one light source emitter includes a single light source, a plurality of optical fibers, and an optical array.

In another aspect combinable with one, some, or all of the previous aspects, operating the at least one light source emitter to emit the light beam toward the reservoir rock formation includes operating the single light source to emit a plurality of light beams, through the plurality of optical fibers, toward the reservoir rock formation; and operating the optical array to radially illuminate the reservoir rock formation with the plurality of light beams.

In another aspect combinable with one, some, or all of the previous aspects, the sensing assembly is configured to interfere the reflected laser beam with the plurality of reflected light beams with an optical-fiber-based beam splitter.

In another aspect combinable with one, some, or all of the previous aspects, the at least one light source emitter includes an array of light source emitters radially arranged around the BHA, and the method includes operating the array of light source emitters to radially illuminate the reservoir rock formation with a plurality of light beams.

In another aspect combinable with one, some, or all of the previous aspects, the at least one optical receiver includes two optical receivers, and the method includes operating the sensing assembly to direct a first portion of the reflected light beams on the photodetector array and a second portion of the reflected light beams on a spectrometer.

In another aspect combinable with one, some, or all of the previous aspects, the reflected light beam includes spectral reflectance information, and the method includes determining, with the controller, a rock type of the reservoir rock formation based on the spectral reflectance information.

Another aspect combinable with one, some, or all of the previous aspects includes generating, with the controller, a plurality of speckle interferograms based on the interference between the reflected laser beam and the reflected light beam, each of the speckle interferograms generated at a particular time instant; and recording, with the controller, the plurality of speckle interferogram into a time-lapse interferogram.

Another aspect combinable with one, some, or all of the previous aspects includes determining, with the controller, a wellbore roughness for each of the plurality of speckle interferogram in the time-lapse interferogram; determining, with the controller, a change of wellbore roughness over the time-lapse interferogram; and determining, with the controller, the angular displacement and the axial displacement of the wellbore based on the change of wellbore roughness.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes implementations of systems and methods for determining rock or wellbore properties (or both) by obtaining or generating wide-band holograms to create a three-dimensional and transient map of the topology and morphology of a reservoir rock formation in situ during high-power laser operations (e.g., drilling, perforating, or heating). Implementations according to the present disclosure can include a bottom hole assembly (BHA) that includes, for example, wideband semiconductors lasers and photo-detectors (e.g., high-speed photodiodes and active-pixel sensors of CCD or CMOS), and other optical components to direct one or more object beams to a target of a reservoir rock formation and collect reflected light in an interferogram (e.g., hologram) that can be analyzed (e.g., cross-correlation, numerical reconstruction, and statistical analysis techniques) to determine one or more mechanical properties of the reservoir rock formation, the wellbore, or both. In some aspects, example implementations of the BHA can be powered by converting a portion of the high-power laser beam to electricity through photovoltaic cells. In some aspects, wide band holograms (also called white light holography or interferometry) can be generated by a wideband light source in the BHA to create the interferogram.

The present disclosure also describes example implementations of systems and methods for determining rock or wellbore properties (or both) using speckle and light-ranging operations with example implementations of a BHA as described. For example, example implementations of the BHA can be operated to provide an all-optical process for determining deformation and displacement measurements in a near wellbore region of a reservoir rock formation. In some aspects, a three-dimensional and transient map of a topology and morphology of the reservoir rock formation in-situ can be used to derive a state of stresses of a subterranean formation following operation of the BHA to generate a high-power laser is used to excite a change in a region of the wellbore.

Figure 1:
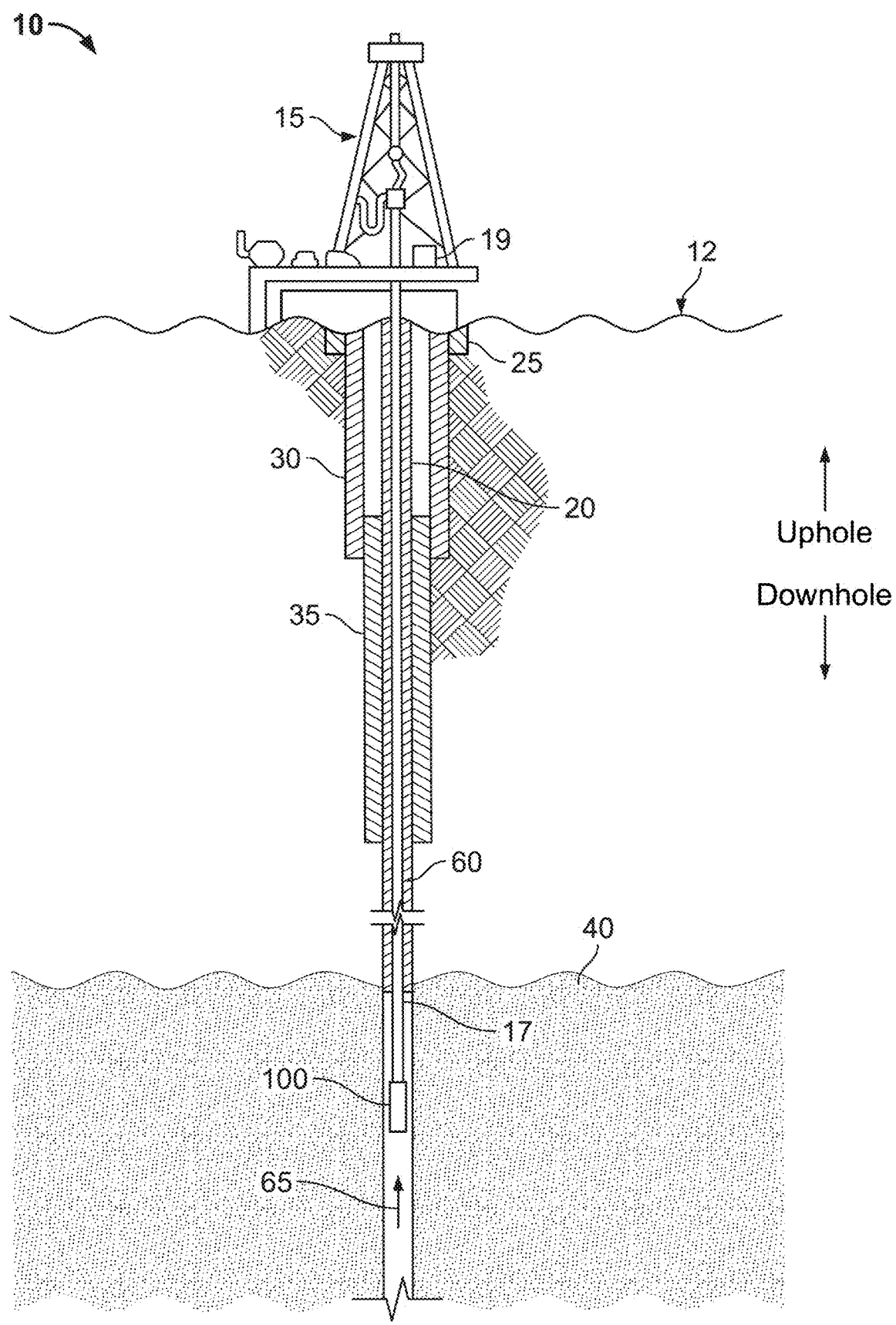
FIG. 1 is a schematic diagram of an example wellbore system that includes a bottom hole assembly having a laser assembly, light source assembly, and control system according to the present disclosure.

As illustrated in FIG. 1, an implementation of a wellbore system 10 includes a wellbore assembly (or "assembly") 15 deployed on a terranean surface 12. The assembly 15 can generally represent a system for deploying a bottom hole assembly (BHA) 100 that is operable to generate laser and other light sources within a wellbore 20. Wellbore 20 extends from the terranean surface 12 and through one or more geological formations in the Earth and into subterranean formation 40 that is located under the terranean surface 12. One or more wellbore casings, such as a surface casing 30 and intermediate casing 35, may be installed in at least a portion of the wellbore 20 (for example subsequent to completion of the drilling operation or some other time). In some aspects, however, a location at which the BHA 100 operates is an open hole location, in which no casings or other wellbore tubulars form a barrier to the subterranean formation 40 (also called a reservoir rock formation).

In some embodiments, the assembly 15 may be deployed on a body of water rather than the terranean surface 12. For instance, in some embodiments, the terranean surface 12 may be an ocean, gulf, sea, or any other body of water under which hydrocarbon-bearing formations may be found. In short, reference to the terranean surface 12 includes both land and water surfaces and contemplates forming and developing one or more wellbore systems 10 from either or both locations.

Generally, the assembly 15 may be any appropriate assembly or rig (e.g., drilling or completion) used to, for example, form wellbores or boreholes in the Earth or otherwise provide for access for the BHA 100 to subterranean formation 40. The assembly 15 can use traditional techniques to form such wellbores, such as the wellbore 20, or may use nontraditional or novel techniques. In some embodiments, as a drilling assembly 15, assembly 15 may use rotary drilling equipment to form the wellbore 20 and other, non-rotary drilling techniques. Rotary drilling equipment is known and may consist of a drill string and a drill bit (or bottom hole assembly that includes a drill bit). In some embodiments, the assembly 15 may consist of a rotary drilling rig. Rotating equipment on such a rotary drilling rig may consist of components that serve to rotate a drill bit, which in turn forms a wellbore, such as the wellbore 20, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string. The drill string is typically attached to the drill bit (for example, as a bottom hole assembly). A swivel, which is attached to hoisting equipment, carries much, if not all of, the weight of the drill string, but may allow it to rotate freely. The non-rotary techniques can include, for example, laser drilling or radial jet drilling techniques, among others.

In some embodiments of the wellbore system 10, the wellbore 20 may be cased with one or more casings. As illustrated, the wellbore 20 includes a conductor casing 25, which extends from the terranean surface 12 shortly into the Earth. A portion of the wellbore 20 enclosed by the conductor casing 25 may be a large diameter borehole. Additionally, in some embodiments, the wellbore 20 may be offset from vertical (for example, a slant wellbore). Even further, in some embodiments, the wellbore 20 may be a stepped wellbore, such that a portion is drilled vertically downward and then curved to a substantially horizontal wellbore portion. Additional substantially vertical and horizontal wellbore portions may be added according to, for example, the type of terranean surface 12, the depth of one or more target subterranean formations, the depth of one or more productive subterranean formations, or other criteria.

Downhole of the conductor casing 25 may be the surface casing 30. The surface casing 30 may enclose a slightly smaller borehole and protect the wellbore 20 from intrusion of, for example, freshwater aquifers located near the terranean surface 12. The wellbore 20 may than extend vertically downward. This portion of the wellbore 20 may be enclosed by the intermediate casing 35.

As shown in this example, a downhole conveyance 17 (e.g., working string of tubulars, wireline, or otherwise) is run into the wellbore 20 with the BHA 100 attached thereto with an annulus 60 between the downhole conveyance 17 and the wellbore 20. As shown in this example, a wellbore fluid 65, such as a production fluid, reservoir fluid, injection fluid, or a mixture thereof, can flow or be static in the wellbore 20.

In some aspects, a control system 19 is positioned on the terranean surface 12 (e.g., at the assembly 15) and controls one or more aspects of the operations of the BHA 100. Optionally, the control system 19 can be part of the BHA 100. In addition, the control system 19 can receive data from the BHA 100 and make one or more determinations with the received data, such as one or more properties of the wellbore 20 or reservoir rock formation 40 based on operations of the BHA 100.

In some aspects, control system 19 is a micro-processor based controller that includes, for example, one or more hardware processors (or other control circuitry, such as application-specific integrated circuits), one or more memory modules, and instructions (e.g., software, firmware, or otherwise) for controlling operations of the BHA 100 and/or making the determinations with the received data, such as one or more properties of the wellbore 20 or reservoir rock formation 40 based on operations of the BHA 100.

Figure 2A:
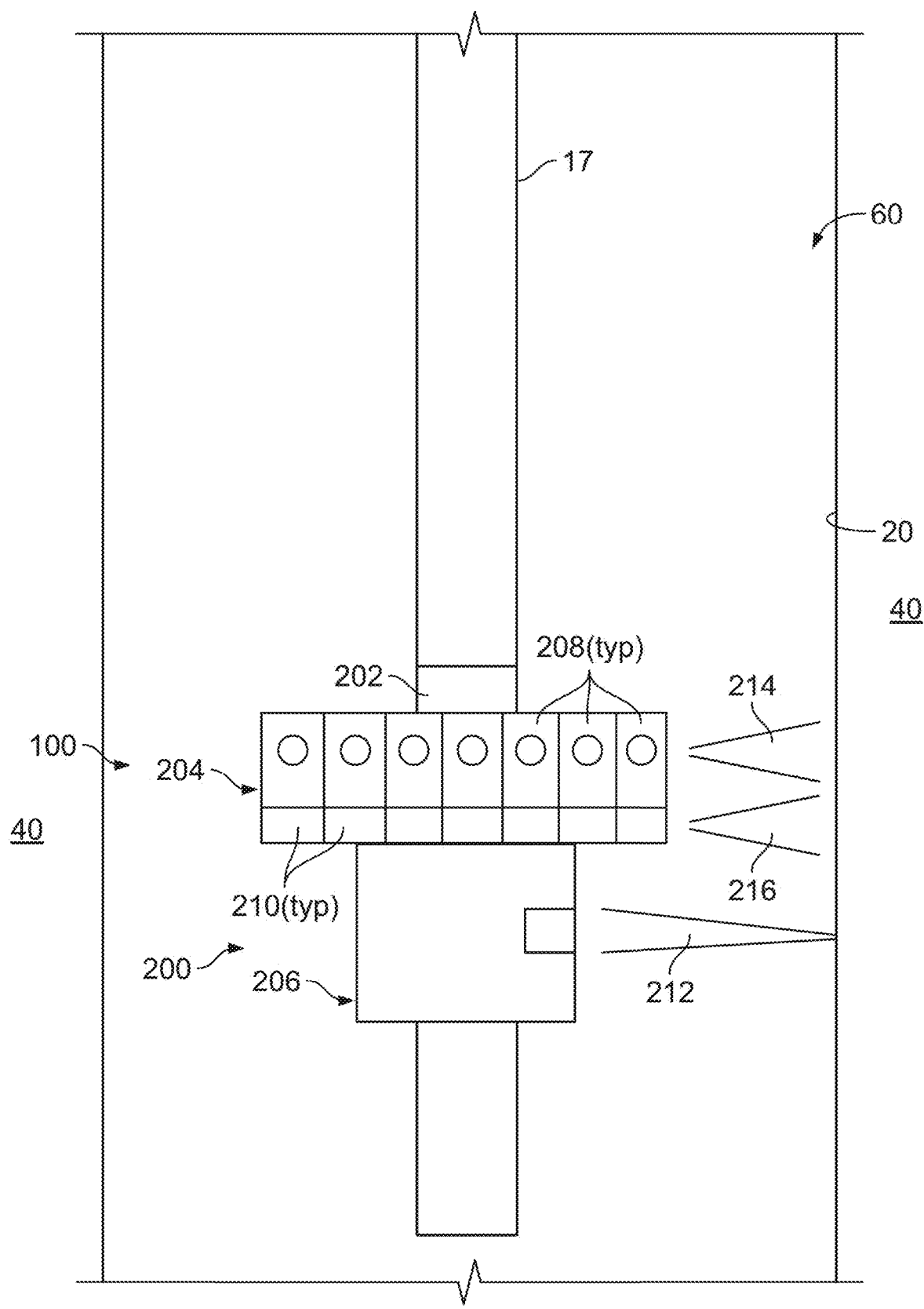
FIG. 2A is a schematic diagram of an example implementation of a bottom hole assembly according to the present disclosure.

FIG. 2A is a schematic diagram of an example implementation of the bottom hole assembly 100 according to the present disclosure. Generally, this example BHA 100 uses wide-band holography to create a three-dimensional and transient map of a topology and property of rocks in-situ (e.g., the reservoir rock formation 40) during high-power laser operations (e.g., drilling, perforating, or heating). As shown in this example, the BHA 100 includes a downhole tool 200 that includes a top sub-assembly 202 that couples (e.g., threadingly, or otherwise) the downhole tool 200 to the downhole conveyance 17. The downhole tool 200, in this example, generally includes a laser head (or laser assembly) 206 and a sensing assembly 204 (and can optionally include the control system 19).

The laser head 206 can be operated to produce at least one laser beam 212 that contacts the reservoir rock formation 40 in the open hole wellbore 20. The sensing assembly 204 includes one or more light sources 208 that are operable to produce one or more light beams 214 to illuminate the reservoir rock formation 40 in the open hole wellbore 20. In operation, the light source(s) 208 can produce the light beam(s) 214 simultaneously with operation of the laser head 206 to produce the laser beam 212 (e.g., during a drilling, perforating, or heating operation). A reflected light beam 216 returns to one or more optical receivers 210 of the sensing assembly 204 from the reservoir rock formation 40 (i.e., as light beams 214 that are reflected from the formation 40).

In operation of the downhole tool 200, the laser beam 212 and light beam 214 are at distinct frequencies (with the light source(s) 208 optionally being a wideband light source). The laser beam 212 is emitted by the laser head 206 to perform the laser operation and, during such operation, illuminate the portion of the wellbore 20 adjacent or near the downhole tool 200 and record the hologram. The sensing assembly 204 uses one or more of the light source(s) 208 to illuminate the scene and obtain spectral data. In some aspects, the light source(s) 208 can encompass the near, mid, and long IR. The range of potential wavelengths include 350-550 nm, 1.5-1.55 um, and mid-to-long wavelength infrared (M/LWIR). Further, light source(s) 208 can be tuned to transmit through wellbore fluids, including hydrocarbons and brines, such as wellbore fluid 65.

In some aspects, the sensing assembly 204 includes photo-detectors (high-speed photodiodes and active-pixel sensors of -CCD or CMOS type), beam splitter, liquid crystal variable retarders, optics, and optomechanical devices to direct a set of light beams 214 (i.e., multiple light beams 214 in a radial output in the wellbore 20) to the reservoir rock formation 40. The light receivers 210 collect the reflected light beams 216, which is made to interfere with a reference beam to create an interferogram (hologram) that can be analyzed using cross-correlation, numerical reconstruction, and statistical analysis techniques.

The light collection by the receivers 210 can use imaging optics to either illuminate a photodetector array (of the sensing assembly 204) directly or couple the reflected light 216 to an optical fiber (of the sensing assembly 204). For example, a portion of the reference beam 212 can also be projected on the photodetector array. Alternatively, the reference laser beam 212 and reflected light beam 216 can be made to interfere via an optical-fiber-based beam splitter. A first portion of the split beam can be directed to a photodiode or expanded and collimated into the photodetector array. The second portion of the split beam can be directed to a spectrometer of the sensing assembly 204.

Through spectroscopy, for example, properties of the reservoir rock formation 40 can be determined or estimated. For example, implementations of the present disclosure can integrate IR reflectance data with, e.g., well logs and other geophysics data from samples of well cores to assist the exploration, development and production of energy resources and mineral deposits. Various implementations of the control system 19 can incorporate a machine learning (ML) algorithm and a ML model to predict, based on the spectroscopic IR reflectance data taken on site, the rock types, the geomechanical properties including the acoustic properties such as the density, compressional velocity Vp and shear velocity Vs. Assessing such geomechanical properties can be beneficial to a host of inquiries ranging from wellbore integrity to completion design. In some implementations, analyzing the IR reflectance data can enable geochemical analysis and provide a molecular characterization of rocks and fluids properties. In contrast to traditional tests that may be destructive and/or require significant time or capital investment, and may lead to sparse characterization of some physical properties, implementations can integrate the in-situ spectroscopic data (e.g., FTIR spectrum data) into one or more ML algorithms (e.g., an unsupervised ML algorithm, a supervised ML algorithm, a deep learning (DL) algorithm) to provide onsite prediction of rock type, geomechanical property, sonic velocity, permeability and other formation properties.

In example implementations, FTIR spectroscopy can generate a FTIR spectrum measures the intensity of an infrared beam after the beam passes through the reservoir rock formation 40. While all molecules can absorb infrared light, each type of molecule exhibits a unique absorption profile. This property can provide a unique characteristic for each molecule, which may be used to identify the molecule type. The FTIR spectrum may be compared against a library of mineral standards to potentially reveal the mineralogy of the rock sample, which can provide rock type data of the reservoir rock formation. FTIR spectroscopy is a non-destructive alternative to conventional quantitative analysis and capable of providing fast and high resolution mapping of petrophysical properties.

In some aspects, the sensing assembly 204 can be arranged as an array of emitters (e.g., light sources 208) and receivers 210 disposed around the downhole tool 200 so to cover multiple angles (e.g., in a circular fashion) in the wellbore 20. Alternatively, the sensing assembly 204 can include a single light source 208, which is coupled to optical fibers and outcoupling optics to illuminate a semi-circular or circular area of the wellbore 20 with light beams 214.

In either embodiment, the receivers 210 collect a portion of the reflected light 216 within a pre-selected viewing angle and direct the collected light to interfere with the laser beam(s) 212 (i.e., the reference beam(s)). The net result is an interferogram. In some aspects, the downhole tool 200 includes multiple laser heads 206 (or a single head with multiple laser sources) at different frequencies to illuminate the wellbore 20 at once. For each example implementation, however, the result is an interferogram, which can be used to determine displacements of the wellbore's surface (i.e., the reservoir rock formation 40 at the wellbore 20).

Figure 2B:
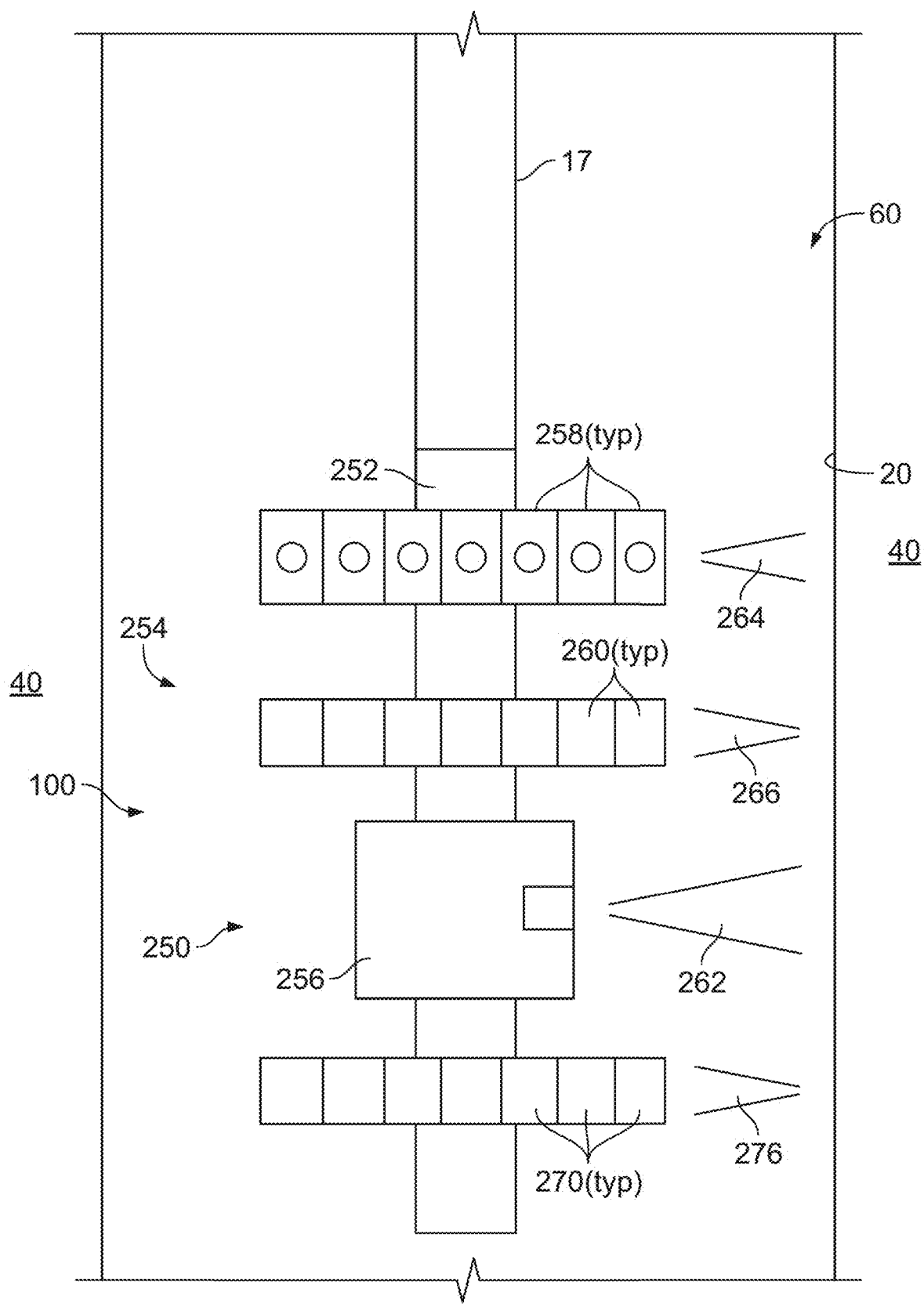
FIG. 2B is a schematic diagram of another example implementation of a bottom hole assembly according to the present disclosure.

FIG. 2B is a schematic diagram of another example implementation of the bottom hole assembly 100 according to the present disclosure. Generally, this example BHA 100 facilitates a contactless method to measure the elasticity of the near-wellbore region using an all-optical assembly within a downhole tool 250. The downhole tool 250, generally, includes laser source 250 and a sensing assembly 254 that includes one or more light sources 258, optical receivers 260, and optical receivers 270. The laser source 256, generally, can be operated (e.g., by control system 19) to induce a thermal change on, or cut, a small region of the reservoir rock formation 40 (e.g., similar to an over-coring test, except the target region can extend up to a ring at a given depth). The net result is a change of the state of stresses around the area of the formation 40 to which a laser beam is applied. Another light source 258, such as a frequency-modulated continuous-wave laser illuminates the target and surrounding areas within the wellbore 20 before, during, and after the exposure to the laser beam from laser source 256. The specular and diffused reflected light is captured and analyzed to determine the displacement vector in the radial, angular, and axial direction. The diffused reflected light from the target creates a speckle interferogram that can be used to determine wellbore properties, such as elasticity.

As shown in this example, the BHA 100 includes a downhole tool 250 that includes a top sub-assembly 252 that couples (e.g., threadingly, or otherwise) the downhole tool 200 to the downhole conveyance 17. The downhole tool 250, in this example, generally includes a laser head (or laser assembly) 256 and a sensing assembly 254 (and can optionally include the control system 19).

The laser head 256 can be operated to produce at least one laser beam 262 that contacts the reservoir rock formation 40 in the open hole wellbore 20. The sensing assembly 254 includes one or more light sources 258 that are operable to produce one or more light beams 264 to illuminate the reservoir rock formation 40 in the open hole wellbore 20. In operation, the light source(s) 258 can produce the light beam(s) 264 simultaneously with operation of the laser head 256 to produce the laser beam 262 (e.g., during a drilling, perforating, or heating operation).

Reflected light beams 266 and 276 return to respective optical receivers 260 and 270 of the sensing assembly 254 from the reservoir rock formation 40 (i.e., as light beams 264 that are reflected from the formation 40).

In operation of the downhole tool 250, the laser beam 262 and light beam 264 are at distinct frequencies (with the light source(s) 258 optionally being a wideband light source). The laser beam 262 is emitted by the laser head 256 to perform the laser operation and, during such operation, illuminate the portion of the wellbore 20 adjacent or near the downhole tool 250 and record the hologram. The sensing assembly 254 uses one or more of the light source(s) 258 to illuminate the scene and obtain spectral data.

In some aspects, the optical receivers 260 and 270 are positioned in the downhole tool 250 on either side of the laser head 256 (as shown). This can be done to capture a comprehensive image of deformation of the wellbore 20. In some aspects, optical receivers 260 and 270 can use integrating spheres, beam condensers, other imaging optics to collect, collimate, and propagate the reflected light beams 266 and 276 through apertures of the optical receivers 260 and 270 and into an optical analysis path. In some aspects, light source 258 can be selected to increase scattering/diffuse reflectance from the reservoir rock formation 40. The wavelength of the light source 258 can be in the long-wavelength IR spectrum to minimize scattering due to the roughness of the wellbore (i.e., increase specular reflection). Alternatively, one light source 258 in the middle range can be used. In all example, wavelength ranges can be chosen to minimize absorption from wellbore fluids, such as wellbore fluid 65.

In some aspects, the sensing assembly 254 includes photo-detectors (high-speed photodiodes and active-pixel sensors of -CCD or CMOS type), beam splitter, liquid crystal variable retarders, optics, and optomechanical devices to direct a set of light beams 264 (i.e., multiple light beams 264 in a radial output in the wellbore 20) to the reservoir rock formation 40. The light receivers 260 and 270 collect the reflected light beams 266 and 276, which are made to interfere with a reference beam to create an interferogram (hologram) that can be analyzed using cross-correlation, numerical reconstruction, and statistical analysis techniques.

The light collection by the receivers 260 and 270 can use imaging optics to either illuminate a photodetector array (of the sensing assembly 254) directly or couple the reflected light 266 to an optical fiber (of the sensing assembly 254). For example, a portion of the reference beam 262 can also be projected on the photodetector array. Alternatively, the reference laser beam 262 and reflected light beams 266 and 276 can be made to interfere via an optical-fiber-based beam splitter. A first portion of the split beam can be directed to a photodiode or expanded and collimated into the photodetector array. The second portion of the split beam can be directed to a spectrometer of the sensing assembly 254.

In some aspects, the sensing assembly 254 can be arranged as an array of emitters (e.g., light sources 258) and receivers 260 disposed around the downhole tool 250 so to cover multiple angles (e.g., in a circular fashion) in the wellbore 20. Alternatively, the sensing assembly 254 can include a single light source 258, which is coupled to optical fibers and outcoupling optics to illuminate a semi-circular or circular area of the wellbore 20 with light beams 264.

In either embodiment, the receivers 260 collect a portion of the reflected light 266 within a pre-selected viewing angle and direct the collected light to interfere with the laser beam(s) 262 (i.e., the reference beam(s)). The net result is an interferogram. In some aspects, the downhole tool 200 includes multiple laser heads 256 (or a single head with multiple laser sources) at different frequencies to illuminate the wellbore 20 at once. For each example implementation, however, the result is an interferogram, which can be used to determine displacements of the wellbore's surface (i.e., the reservoir rock formation 40 at the wellbore 20).

Figure 3:
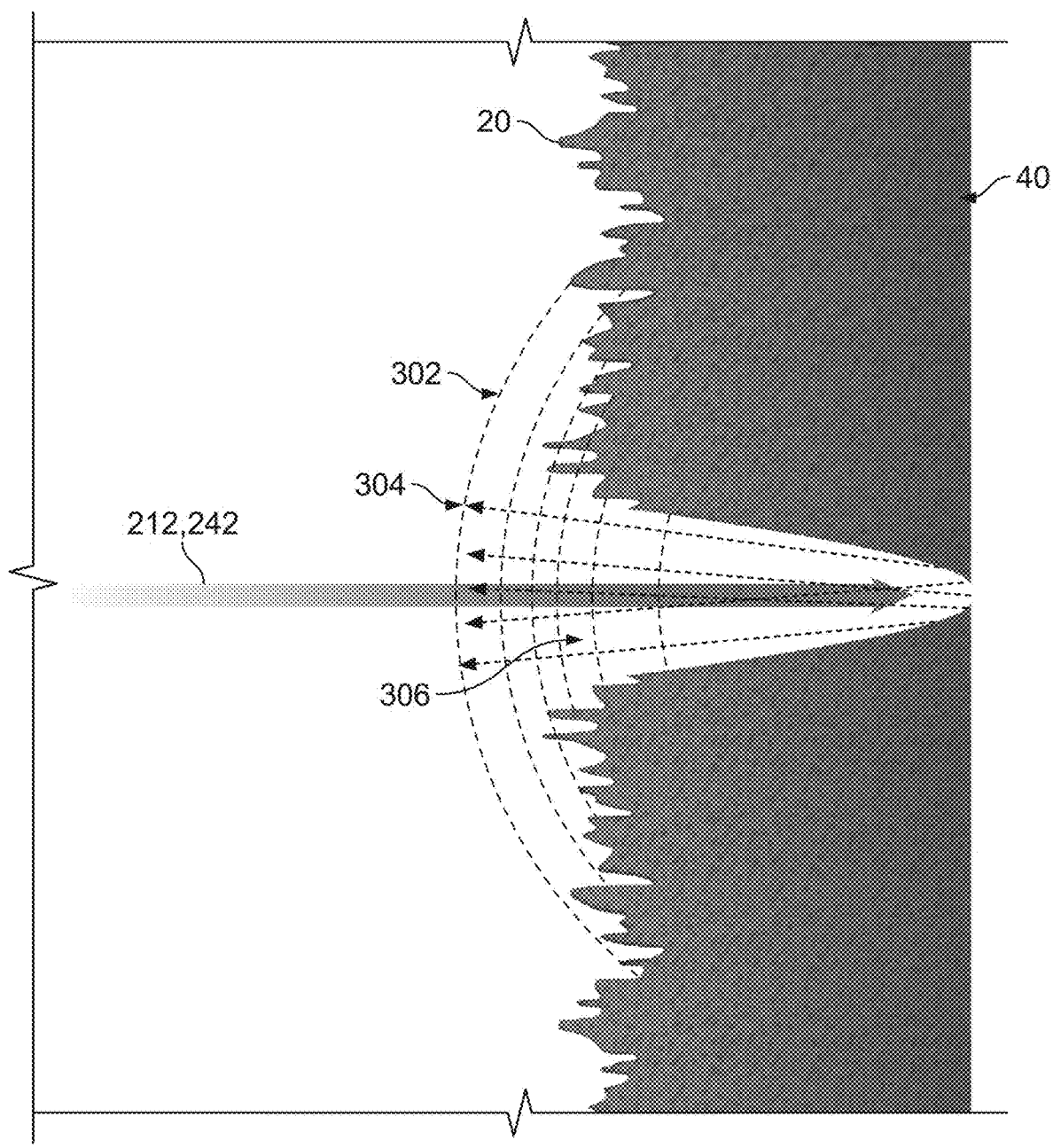
FIG. 3 is a schematic diagram that illustrates resulting physical dynamics of a high power laser that contacts a reservoir rock formation in a wellbore according to the present disclosure.

Turning to FIG. 3, this figure is a schematic diagram that illustrates a resulting physical dynamics of a high power laser that contacts the reservoir rock formation 40 in the wellbore 20. More specifically, this figure shows the result of the laser beam 212 (or 262) contacting the reservoir rock formation 40 during, e.g., a perforating, heating, or other laser operation. When the laser beam 212 (or 262) contacts the reservoir rock formation 40, several physical processes occur, including reflectance 304 (scattered reflected beams). First, there are mechanical effects, including volumetric expansion, thermal stress, shear slippage, and spallation of the reservoir rock formation 40. Second, an ejection plume 306 results from the contact of the laser beam 212 (or 262) with the reservoir rock formation 40. The ejection plume 306 include spallated/vaporized material, compressed air cleaning (melt and vapor phases), pressure waves, and the Bernoulli effect. Third, radiation absorption, including black body radiation 302, occurs. The radiation absorption includes fresnal absorption; solid, melt, and vapor absorption; scattering and multiple reflections (rock surface, melt, vapor phases); and other absorption that depends on temperature, pressure, and laser beam characteristics. Fourth, heat transfer and phase transition occurs, including conductive and invective flux; melting, evaporation, sublimation and resolidification; vapor pressure on a vapor interface; mass transport between phases; a heated affected zone (HAZ); and other effects that depend on temperature and pressure.

Figure 2C:
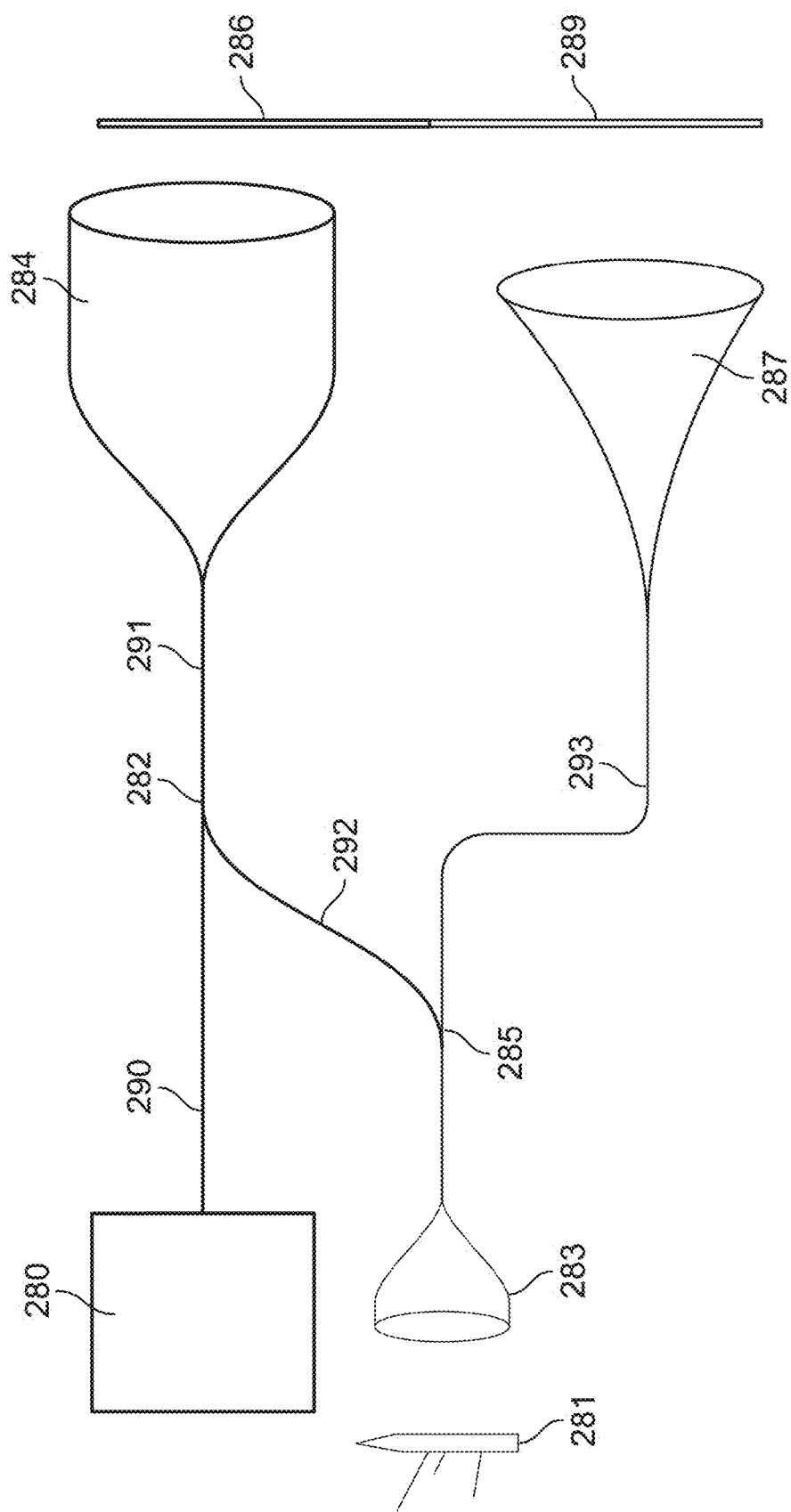
FIG. 2C is a schematic diagram of a portion of an example implementation of a bottom hole assembly according to the present disclosure.

FIG. 2C is a schematic diagram of a portion of an example implementation of a bottom hole assembly according to the present disclosure. For example, FIG. 2C shows a more specific representation of a light source and optical receiver assembly that can be used, for example, in sensing assemblies 204 or 254 in downhole tools 200 or 250, respectively. As shown in FIG. 2C, a light source 280 is coupled to an outcoupler 284 through a beam splitter 282 (that splits light beam 290 into a first split beam 291 and a second split beam 292. The first split beam 291 is output through outcoupler 284 as a light output 286.

An optical receiver 289 collects a reflected light beam 293 through an incoupler 287 and to a beam splitter/filter 285. The reflected beam 293 is provided to an imager 283 and photodetector (e.g., single or multi pixel CCD/CMOS) for recording an interference pattern between the reflected light beam 293 and the second split beam 292.

Figure 4A:
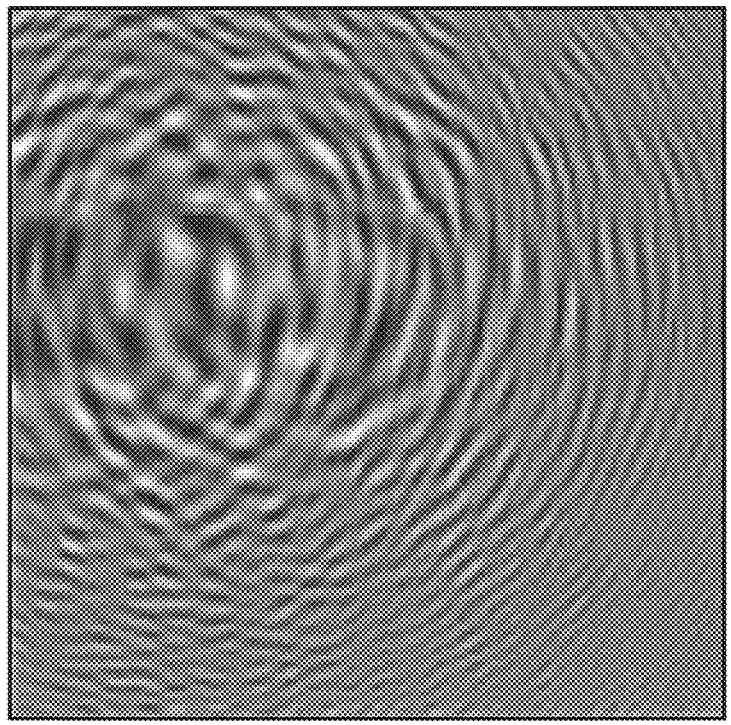
FIGS. 4A and 4B are graphical images of interferograms resulting from operation of a bottom hole assembly according to the present disclosure.
Figure 4B:
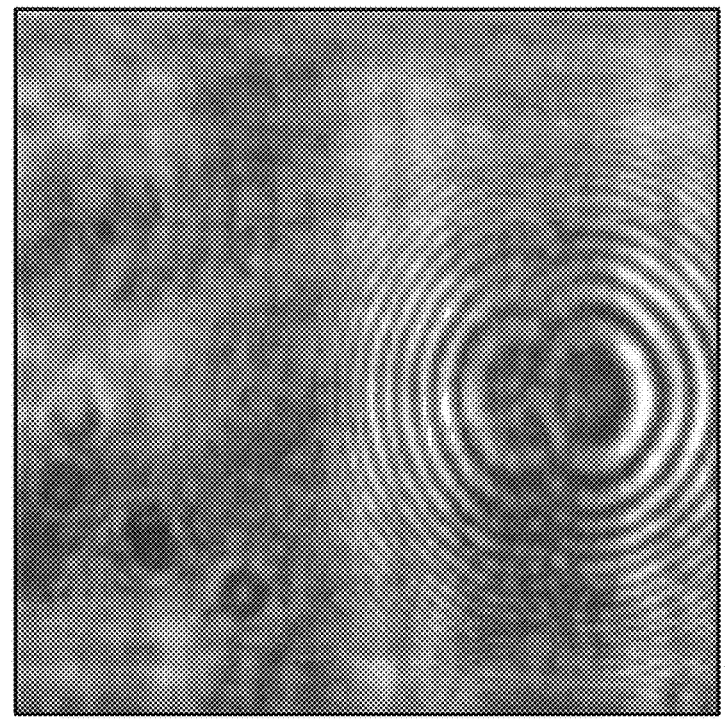

This interference pattern, or interferogram, are exemplified in FIGS. 4A and 4B. FIG. 4A shown a graphical image (or interferogram) 400, at a time, $t_{i-1}$, while FIG. 4B shown a graphical image (or interferogram) 450, at a time, $t_i$, during operation of the light source and optical receiver assembly shown here.

Figure 5A:
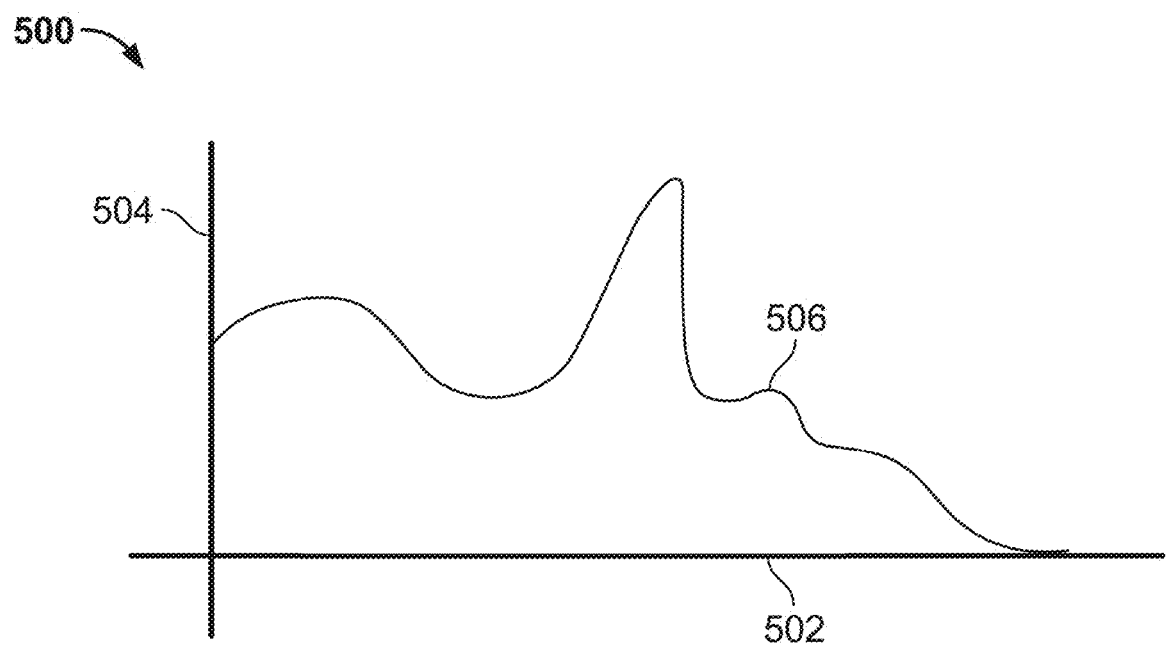
FIGS. 5A and 5B are graphs that illustrate a spectral response of operation of a bottom hole assembly according to the present disclosure.
Figure 5B:
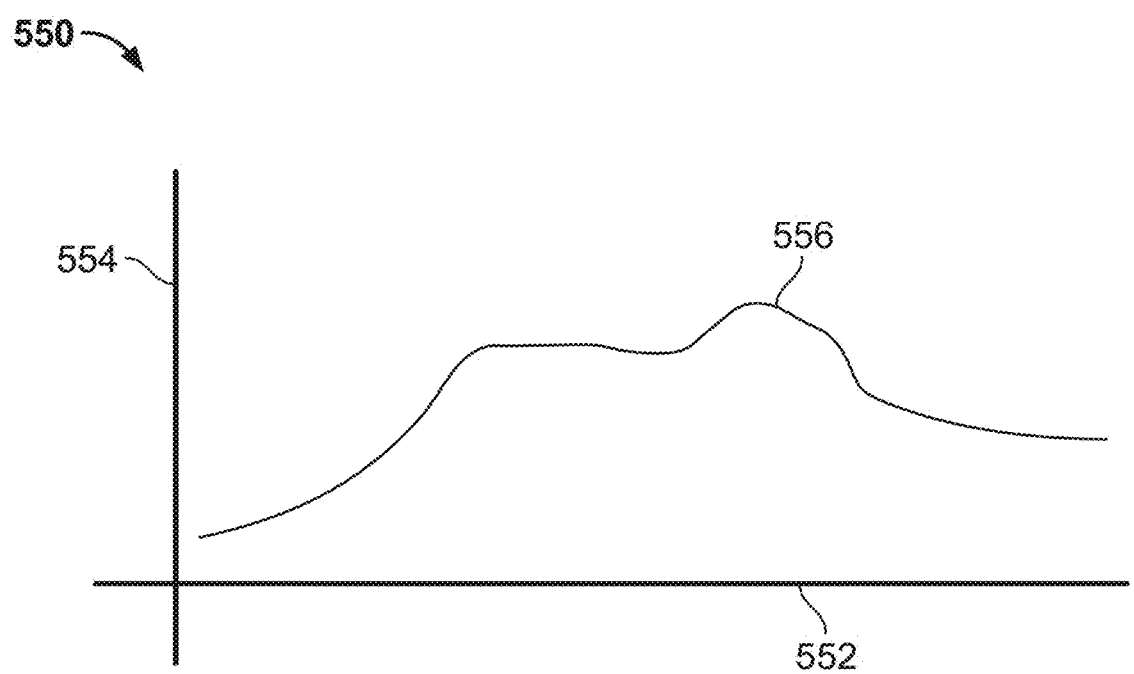

In addition, FIGS. 5A and 5B are graphs that illustrate a spectral response of operation of a bottom hole assembly according to the present disclosure. For example, FIG. 5A illustrates graph 500 that includes an x-axis 502 of wavelength and a y-axis 504 of intensity. A curve 506 represents the relationship of intensity of the light source vs. wavelength of the light source. FIG. 5B illustrates graph 550 that includes an x-axis 552 of wavelength and a y-axis 554 of intensity. A curve 556 represents the relationship of intensity of the light source vs. wavelength of the light source.

FIGS. 2D-2G are schematic diagrams of portion of an example implementation of a bottom hole assembly that is used in a speckle interferometry and analysis system according to the present disclosure. For example, operation of the downhole tool 250 can (as previously described) generate interferograms to infer wellbore displacements using cross-correlations and 3D inverse mapping analysis by the control system 19 (based on the output of the laser and light beams and collection of the reflected beams). In this approach, the 3D mapping uses a sparse point cloud from the light source 258 to generate a coarse mapping of the wellbore 20 and radial displacement thereof. The speckle interferogram provides high-resolution displacement information of the wellbore 20 in the angular and axial direction. In addition, a cross-correlation of the raw (interferogram) and 3D structured data can be used to detect anomalies, which could be further investigated using temporal analysis or other sophisticated method in post-analysis. In example aspects, a time-lapse of the raw data is recorded to determine relative wellbore displacement and changes.

Figure 2D:
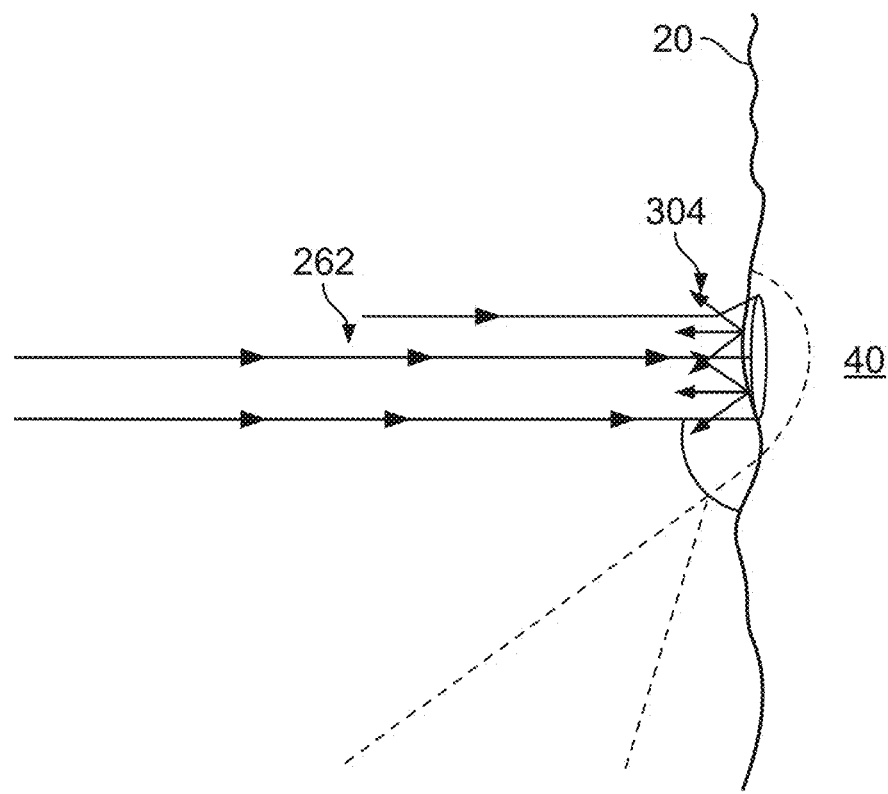
FIGS. 2D-2G are schematic diagrams of portion of an example implementation of a bottom hole assembly that is used in a speckle interferometry and analysis system according to the present disclosure.
Figure 2E:
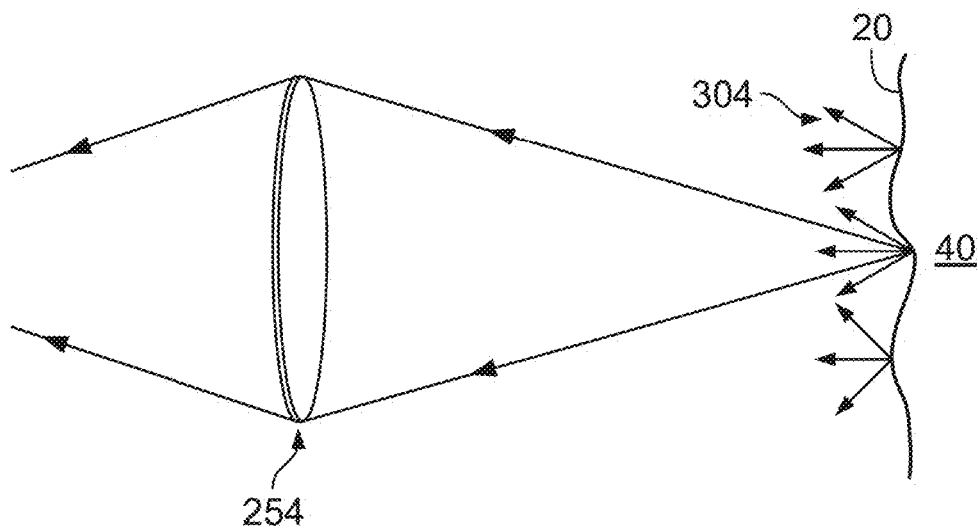
Figure 2F:
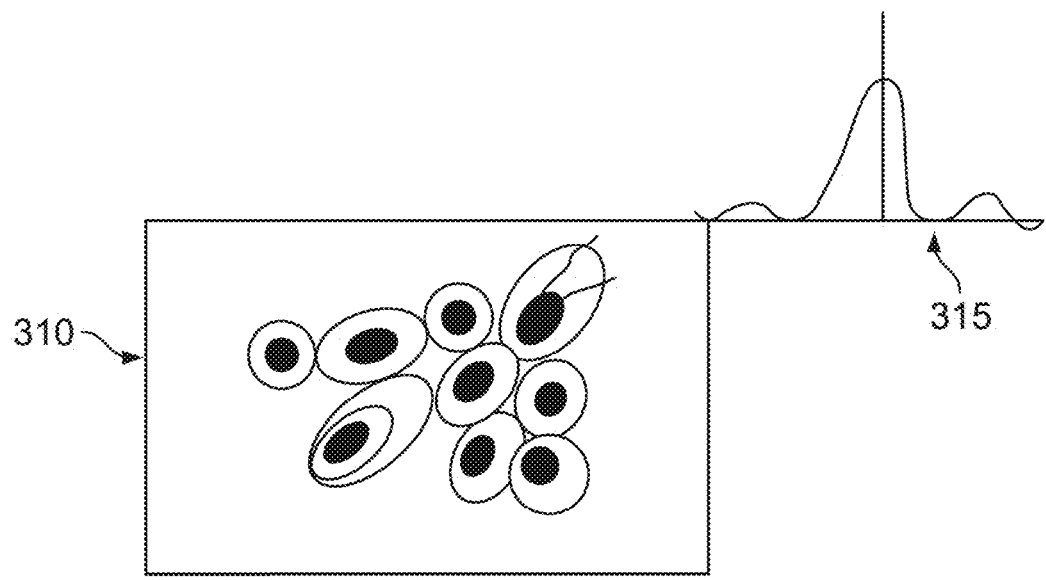
Figure 2G:
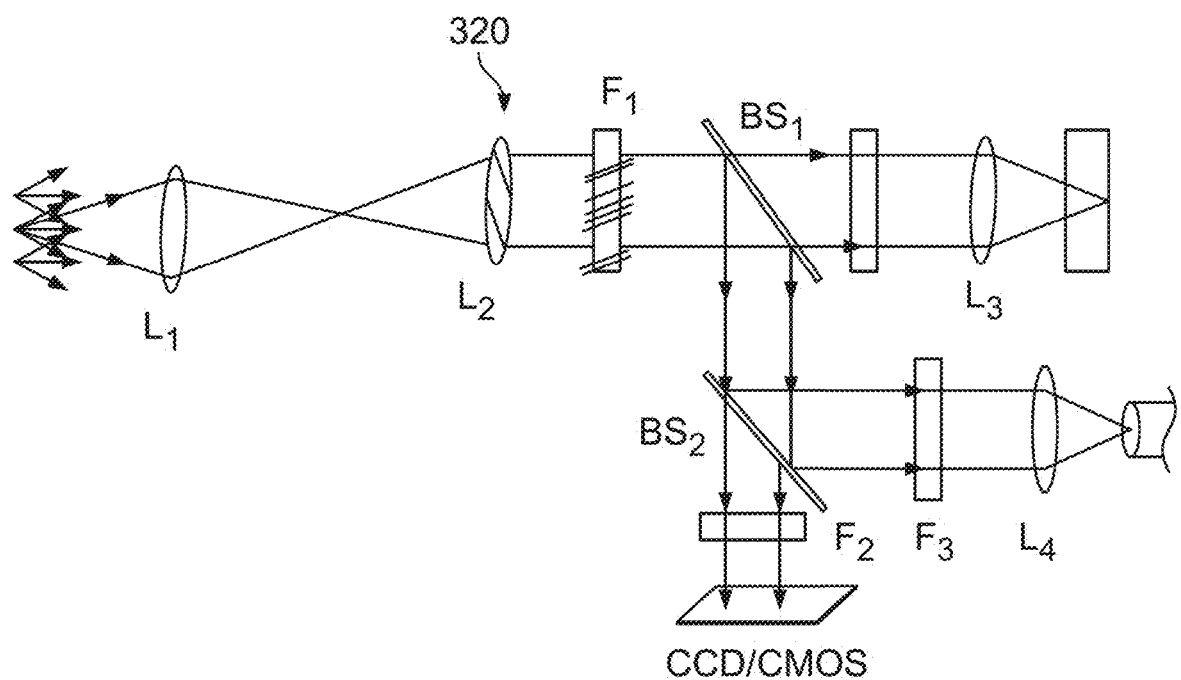

Generally, FIGS. 2D-2G show an example operation of speckle holography using the downhole tool 250. FIG. 2D shows the laser beam 262 illuminating a region of the reservoir rock formation 40 with backscattered diffused radiation 304. FIG. 2E shows a portion of the backscattered light 304 within a solid angle condensing through the sensing assembly 254 (e.g., through a focusing and projection optics) to create an interference (speckle) pattern. As shown in FIG. 2F, a speckle interferogram 310 can be recorded to create an interferogram time-lapse 315. Every frame (static) provides information about the roughness of the rock's surface in the wellbore 20. The assembly of frames over time can provide information about the laser-rock interaction and the rock properties of the reservoir rock formation 40. The luminosity distribution also encodes information about the absorption of the material in the rock formation 40. FIG. 2G shows an example configuration of the sensing assembly that includes multiple lenses (labeled $L_{1-i}$, multiple beam splitters labeled $BS_{1-i}$, and multiple filters labeled $F_{1-i}$). The filters can be interference, band bass, or other type.

In an example operation of the downhole tool 250, and more particularly with the control system 19 after operation of the laser source 256 and the light source 258, a speckle pattern is constructed to measure the wellbore displacement by combining or removing the original (reference) speckle pattern with an image of the speckle pattern after displacement. This pattern can be linked to surface displacement through calibration and analysis. For example, to convert speckle interferograms produced by the downhole tool 250 into comprehensible mechanical properties, a gradient of displacement can be used to infer strain. The calculation of strain involves an initial step of determining the displacement field (u, v) from the correlation coefficient (C) between the reference speckle pattern (I_reference) and the deformed speckle pattern (I_deformed). The correlation coefficient at a specific point test point (x, y) in the wellbore 20 is expressed as:

$$C(x,y) = \Sigma[I_{reference(x,y)} * I_{deformed(x+u,y+v)}] \qquad \text{Eq. 1.}$$

In Eq. 1, C(x,y) quantifies the similarity between the speckle patterns (i.e., displacement gradient) and (u, v) represents the displacement vector required to align these patterns. After obtaining the displacement field, strain can be calculated. Assuming small strain theory and linear elasticity, strain components can be derived as in the following equations (including shear strain):

$$\varepsilon_{xx} = \frac{\partial u}{\partial x}, \qquad \text{Eq. 2}$$

$$\varepsilon_{yy} = \frac{\partial u}{\partial y}, \text{ and} \qquad \text{Eq. 3}$$

$$\gamma_{xy} = \frac{1}{2}\left(\frac{\partial u}{\partial y} + \frac{\partial u}{\partial x}\right). \qquad \text{Eq. 4}$$

These equations establish the relationship between strain components and the gradients of wellbore displacement. This methodology allows for control system 19 to perform quantitative evaluation of strain in materials via speckle interferometry, facilitating mechanical property characterization and deformation assessment through known mechanical properties correlations such as Hooke's Law to obtain Young's elasticity modulus:

$$E = \frac{\sigma}{\varepsilon}. \qquad \text{Eq. 5}$$

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A downhole tool system, comprising:
 a bottom hole assembly, comprising:
  a connector configured to couple to a downhole conveyance run into a wellbore from a terranean surface to a reservoir rock formation;
  a laser head configured to emit a laser beam toward the reservoir rock formation at a fixed frequency;
  at least one light source emitter configured to emit a light beam toward the reservoir rock formation; and
  a sensing assembly comprising at least one optical receiver configured to (1) receive a reflected laser beam from the reservoir rock formation and a reflected light beam from the reservoir rock formation, and (2) interfere the reflected laser beam with the reflected light beam; and
 a controller communicably coupled to the sensing assembly and configured to perform operations comprising:
  generating at least one speckle interferogram based on the interference between the reflected laser beam and the reflected light beam; and determining an angular displacement and an axial displacement of the wellbore based on the at least one speckle interferogram.

2. The downhole tool system of claim 1, wherein the emitted light beam has a wavelength at a long IR spectrum.

3. The downhole tool system of claim 2, wherein the wavelength is at 1500-1600 nanometers.

4. The downhole tool system of claim 1, wherein the laser head is configured to emit the laser beam toward the reservoir rock formation to induce a thermal change on the reservoir rock formation and change a stress state of the reservoir rock formation.

5. The downhole tool system of claim 1, wherein the emitted light beam is tuned to transmit through a wellbore fluid in the wellbore.

6. The downhole tool system of claim 1, wherein the at least one light source emitter comprises:
a single light source; and
a plurality of optical fibers configured to emit a plurality of light beams from the single light source;
an optical array configured to radially illuminate the reservoir rock formation with the plurality of light beams.

7. The downhole tool system of claim 6, wherein the sensing assembly is configured to interfere the reflected laser beam with the plurality of reflected light beams with an optical-fiber-based beam splitter.

8. The downhole tool system of claim 1, wherein the at least one light source emitter comprises an array of light source emitters radially arranged around the BHA and configured to radially illuminate the reservoir rock formation with a plurality of light beams.

9. The downhole tool system of claim 8, wherein the at least one optical receiver comprises two optical receivers, each receiver comprising a photodetector array, and the sensing assembly is configured to direct a first portion of the reflected light beams on the photodetector array and a second portion of the reflected light beams on a spectrometer.

10. The downhole tool system of claim 1, wherein the reflected light beam comprises spectral reflectance information, and the operations comprise:
determining a rock type of the reservoir rock formation based on the spectral reflectance information.

11. The downhole tool system of claim 1, wherein the operations comprise:
generating a plurality of speckle interferograms based on the interference between the reflected laser beam and the reflected light beam, each of the speckle interferograms generated at a particular time instant; and
recording the plurality of speckle interferogram into a time-lapse interferogram.

12. The downhole tool system of claim 11, wherein the operations comprise:
determining a wellbore roughness for each of the plurality of speckle interferogram in the time-lapse interferogram;
determining a change of wellbore roughness over the time-lapse interferogram; and
determining the angular displacement and the axial displacement of the wellbore based on the change of wellbore roughness.

13. A method of determining one or more wellbore characteristics, comprising:
positioning a bottom hole assembly (BHA) on a downhole conveyance at a reservoir rock formation in a wellbore, the BHA comprising:
a laser head;
at least one light source emitter; and
a sensing assembly comprising at least one optical receiver;
operating the laser head to emit a laser beam toward the reservoir rock formation at a fixed frequency;
operating the at least one light source emitter to emit a light beam toward the reservoir rock formation;
sensing, with the at least one optical receiver, a reflected laser beam from the reservoir rock formation and a reflected light beam from the reservoir rock formation;
interfering, with the sensing assembly, the reflected laser beam with the reflected light beam to generate an interferogram;
generating, with a controller communicably coupled to the sensing assembly, generating at least one speckle interferogram based on the interference between the reflected laser beam and the reflected light beam; and
determining, with the controller, an angular displacement and an axial displacement of the wellbore based on the at least one speckle interferogram.

14. The method of claim 13, comprising operating the at least one light source emitter to emit the light beam toward the reservoir rock formation with a wavelength at a long IR spectrum.

15. The method of claim 14, wherein the wavelength is at 1500-1600 nanometers.

16. The method of claim 13, comprising operating the laser head to emit the laser beam toward the reservoir rock formation to induce a thermal change on the reservoir rock formation and change a stress state of the reservoir rock formation.

17. The method of claim 13, comprising operating the at least one light source emitter to emit the light beam toward the reservoir rock formation at a frequency or wavelength that is tuned to transmit through a wellbore fluid in the wellbore.

18. The method of claim 13, wherein the at least one light source emitter comprises a single light source, a plurality of optical fibers, and an optical array, and operating the at least one light source emitter to emit the light beam toward the reservoir rock formation comprises:
operating the single light source to emit a plurality of light beams, through the plurality of optical fibers, toward the reservoir rock formation; and
operating the optical array to radially illuminate the reservoir rock formation with the plurality of light beams.

19. The method of claim 18, wherein the sensing assembly is configured to interfere the reflected laser beam with the plurality of reflected light beams with an optical-fiber-based beam splitter.

20. The method of claim 13, wherein the at least one light source emitter comprises an array of light source emitters radially arranged around the BHA, the method comprising:
operating the array of light source emitters to radially illuminate the reservoir rock formation with a plurality of light beams.

21. The method of claim 20, wherein the at least one optical receiver comprises two optical receivers, the method comprising:
operating the sensing assembly to direct a first portion of the reflected light beams on the photodetector array and a second portion of the reflected light beams on a spectrometer.

22. The method of claim 13, wherein the reflected light beam comprises spectral reflectance information, the method comprising:
- determining, with the controller, a rock type of the reservoir rock formation based on the spectral reflectance information.

23. The method of claim 13, comprising:
- generating, with the controller, a plurality of speckle interferograms based on the interference between the reflected laser beam and the reflected light beam, each of the speckle interferograms generated at a particular time instant; and
- recording, with the controller, the plurality of speckle interferogram into a time-lapse interferogram.

24. The method of claim 13, comprising:
- determining, with the controller, a wellbore roughness for each of the plurality of speckle interferogram in the time-lapse interferogram;
- determining, with the controller, a change of wellbore roughness over the time-lapse interferogram; and
- determining, with the controller, the angular displacement and the axial displacement of the wellbore based on the change of wellbore roughness.

* * * * *